United States Patent
De Bruijn

(10) Patent No.: US 9,791,649 B2
(45) Date of Patent: Oct. 17, 2017

(54) MOUNTING FRAME SYSTEM

(71) Applicant: FCI AMERICAS TECHNOLOGY LLC, Carson City, NV (US)

(72) Inventor: Jeroen De Bruijn, Loon op Zand (NL)

(73) Assignee: FCI Asia Pte. Ltd., Singapore (SG)

( * ) Notice: Subject to any disclaimer, the term of this patent is extended or adjusted under 35 U.S.C. 154(b) by 0 days.

(21) Appl. No.: 14/911,888

(22) PCT Filed: Aug. 7, 2014

(86) PCT No.: PCT/US2014/050055
§ 371 (c)(1),
(2) Date: Feb. 12, 2016

(87) PCT Pub. No.: WO2015/023500
PCT Pub. Date: Feb. 19, 2015

(65) Prior Publication Data
US 2016/0195684 A1   Jul. 7, 2016

Related U.S. Application Data

(60) Provisional application No. 61/865,789, filed on Aug. 14, 2013.

(51) Int. Cl.
*G02B 6/36* (2006.01)
*H01R 12/00* (2006.01)
*H05K 1/00* (2006.01)
*G02B 6/42* (2006.01)
*G02B 6/38* (2006.01)
*F16B 21/02* (2006.01)

(52) U.S. Cl.
CPC ......... *G02B 6/4292* (2013.01); *G02B 6/3897* (2013.01); *G02B 6/428* (2013.01); *G02B 6/4231* (2013.01); *G02B 6/4261* (2013.01); *F16B 21/02* (2013.01)

(58) Field of Classification Search
CPC ...... H01R 13/514; H01R 13/639; H01R 4/18; H01R 4/58; H01R 12/91; G02B 6/4292; G02B 6/4261; G02B 6/428; G02B 6/4231; G02B 6/3897
USPC ...... 439/65, 66, 68, 70, 71, 73, 74, 82, 345, 439/379, 680, 751
See application file for complete search history.

(56) References Cited

U.S. PATENT DOCUMENTS

| 3,551,964 | A | * | 1/1971 | Shaw | B60P 7/132 24/287 |
| 6,929,484 | B2 | * | 8/2005 | Weiss | H01R 13/2421 439/66 |
| 7,090,507 | B2 | | 8/2006 | Wertz et al. | |

(Continued)

FOREIGN PATENT DOCUMENTS

JP    2001-522523    11/2001

*Primary Examiner* — Robert Tavlykaev
(74) *Attorney, Agent, or Firm* — Wolf, Greenfield & Sacks, P.C.

(57) ABSTRACT

A mounting frame system is disclosed that facilitates the mounting of optical connector modules to printed circuit boards. The mounting frame system can include a mounting frame that is configured to attach to a printed circuit board, and is adapted to attach to a connector module. Thus, the mounting frame system can further allow releasable mounting of optical connector modules to the printed circuit board, such that the mounting is achieved in a safe and reliable manner.

20 Claims, 5 Drawing Sheets

(56) References Cited

U.S. PATENT DOCUMENTS

| | | |
|---|---|---|
| 7,871,275 B1 | 1/2011 | McClellan et al. |
| 2006/0003608 A1 | 1/2006 | Sandoval et al. |
| 2008/0248678 A1 | 10/2008 | Tuerschmann et al. |
| 2010/0297857 A1 | 11/2010 | Ito |
| 2011/0230067 A1 | 9/2011 | Champion et al. |
| 2011/0269330 A1 | 11/2011 | Chang et al. |
| 2015/0003791 A1* | 1/2015 | Butler .................... G02B 6/428 385/88 |

\* cited by examiner

MOUNTING FRAME SYSTEM

CROSS-REFERENCE TO RELATED APPLICATIONS

This application is the National Stage of International Application No. PCT/US2014/050055, filed Aug. 7, 2014, which claims the benefit of U.S. application No. 61/865,789, filed Aug. 14, 2013, the disclosures of which are incorporated herein by reference in their entireties.

FIELD OF THE DISCLOSURE

The present disclosure relates to a mounting frame system for the mounting of a, preferably optical, connector module to a printed circuit board (PCB).

BACKGROUND

In many electronic applications, signal lines (such as optical signal lines) are connected to substrates, such as printed circuit boards. The mounting and connection of signal lines, and in particular optical signal lines, to the printed circuit board can require specific connector modules, in particular if the optical signal line, and the respective corresponding optical connector module, is intended to be releasable mountable to the PCB.

US 2008/0248678 describes a connector fastening arrangement that mounts a connector housing to a printed circuit board. The connector housing comprises a number of electrical contact terminals ending in corresponding solder contact ends that in assembled condition are in contact with respective solder pads of the printed circuit board. The housing of the connector is directly attached to the printed circuit board, namely by means of locking bolts having a crank pin-like configuration including an offset peg portion that protrudes eccentrically with respect to the axis of rotation and which is dimensioned and designed that it can be inserted through a passage hole provided in the printed circuit board. After inserted through the passage hole, the locking bolt is displaced by a rotational movement, such that the offset peg portion moves a part of the locking device under the bottom side of the PCB, thereby locking the connector housing to the printed circuit board.

SUMMARY

In accordance with one aspect of the present disclosure, a mounting frame system facilitates the mounting of in particular optical connector modules to printed circuit boards. The mounting frame can allow a releasable mounting of e.g. an optical connector module to a PCB, such that the mounting is achieved in a safe and reliable manner.

These and other aspects which will become apparent upon reading the following description are solved by a mounting frame system according to claim 1.

According to the present disclosure, a mounting frame system for the mounting of a connector module, in particular an optical connector module, to a printed circuit board (PCB) is provided, which system comprises a mounting frame that is attachable to the surface of the PCB and which is adapted for the mounting of the connector module thereon. The mounting frame can for example be glued and/or soldered onto the surface of the PCB or it can be attached thereon by means of a screw fixation or similar. The mounting frame itself needs not necessarily to be attached releasable on the PCB. In preferred embodiments, the mounting frame comprises an interposer or similar intermediate substrate to provide an electrical interface between the mounting frame and the module. The mounting frame can thus also be considered as a socket and the connector module as the corresponding plug connector. Preferably, the mounting frame comprises an essentially rectangular base frame made for example from plastic, which has on an outside wall thereof at least one locking undercut portion accessible from a peripheral side of the wall and which is designed or formed to provide the female counterpart of a twistlock. As the skilled person recognizes, a twistlock connection usually requires a female part and a male part. The male part in its simplest form is a bolt having a locking protrusion on one end and the female part is provided with a corresponding aperture or opening, which allows the insertion of the locking projection of the male part, if the male part is arranged in a suitable angular orientation with respect to the opening of the female part. After insertion of the respective male part of the twistlock connection, the twistlock can be closed or locked by rotating the male part for a suitable angular amount, like for example 180 degrees, in which orientation it is no longer be possible to remove the male part. Thus, by providing an undercut portion on an outside wall of the base frame the present invention allows to use female twistlock members, which are not fully enclosed apertures provided in the base frame but which are open on at least one side. Due to the inventive construction of a locking undercut provided on the outside wall of the rectangular base frame which is accessible from the peripheral side of the wall, the use of male twistlock members with particularly advantageous locking projections is possible, which can for example be particularly larger than in the above cited prior art and offer thereby a more reliable connection. In addition, preferably, the mounting frame may have a cut-out in the shape of a semi-circle on an outside wall of the base frame, which cut-out allows access to the undercut portion from the top side of the frame.

The base frame can include a mount or mate assist member adapted to hold a corresponding (optical) connector module in a pre-assembled position. The mount assist member can for example be provided in form of one or more latching arms adapted to latch onto a corresponding portion of a connector module at the beginning of the mating process of module and mounting frame, so that the latching arm(s) latch onto the module before the same is inserted into the fully mated position. The latching arm thus holds the module in close proximity to the mounting frame, whereby for example a manual mounting of the module to the frame is facilitated. Most preferably, at least one pair of latching arms is provided.

The base frame can be essentially rectangular having walls protruding perpendicular from the surface of the PCB when it is attached thereto. The locking undercut is thereby arranged in an outer peripheral wall of the base frame and accessible from the peripheral side of the wall, i.e. from a direction parallel to the plane defined by the rectangular base frame. In other words, the locking undercut is accessible from a direction which is parallel to the plane defined by the PCB, which carries the mounting frame in assembled condition. Preferably, the mounting frame, respectively the base frame thereof, has a top side and a bottom side. The bottom side of the frame is the side facing the surface of the PCB when mounted thereon and the top side is the side opposite of the bottom side. To facilitate the mounting of the module onto the frame, the top side has preferably at least one cut-out in the shape of essentially a semi-circle, which cut-out allows additionally access to the undercut portion from the top side of the frame.

The mounting frame system can further include a corresponding (in particular: optical) connector module, which is adapted to be preferably releasable mountable to the mounting frame. To this end, it is preferred that the module comprises at least one male twistlock member adapted to engage the locking undercut to releasable mount the module onto the mounting frame.

In accordance with certain embodiments, the male twistlock member provided on the module comprises a bolt, which extends through the optical connector module and which bolt is arranged on the module such that it is moveable in axial or longitudinal direction of the bolt and such that it is arranged rotatable around the longitudinal axis of the bolt. Most preferably, the axial or longitudinal extension of the bolt is parallel to the general mating direction of the module, i.e. the bolt is arranged moveable in the mating direction of the module. This facilitates the mounting process, as will be described in more detail below under reference to the figures. A particularly advantageous design is achievable, when the male twistlock member has an upper part projecting from the top face of the optical connector module and a lower part, which projects from the bottom face of the optical connector module. In other words, the male twistlock member, respectively the bolt of the twistlock member, extends completely through at least a part of the module. The upper part of the bolt projecting from the top face of the module is preferably provided with a suitable compression spring. The compression spring rests with one end on the housing of the module and the other end of the compression spring is functionally connected with the upper part of the bolt. Thereby, when moving the bolt in longitudinal direction, (i.e. in mating direction of the module) the compression spring is biased and provides a bias or load force acting in the opposite direction, i.e. in the un-mating direction of the module. The lower part of the bolt in turn comprises a locking projection, which extends perpendicular to the longitudinal axis of the bolt, so that the bolt is held onto the module despite the three of the compression spring. In preferred embodiments, the locking projection of the bolt has for example a semi-circular cross-section in a plane perpendicular to the longitudinal axis of the bolt and offers thereby a particularly large active locking surface and thus a particularly reliable and secure locking function in connection with the corresponding locking undercut of the base frame.

In accordance with certain embodiments, the optical module comprises an essentially rectangular base shape and has four male twistlock members, arranged in respective four opposite sides of the base, as for example on the four corners of the rectangular base. Correspondingly, also the essentially rectangular mounting frame comprises four undercut portions, i.e. the female counter parts of the twistlock, in alignment with the four male twistlock members of the module.

BRIEF DESCRIPTION OF THE DRAWINGS

In the following, the invention is described exemplarily with reference to the enclosed figures, in which.

DETAILED DESCRIPTION

Figure 1:
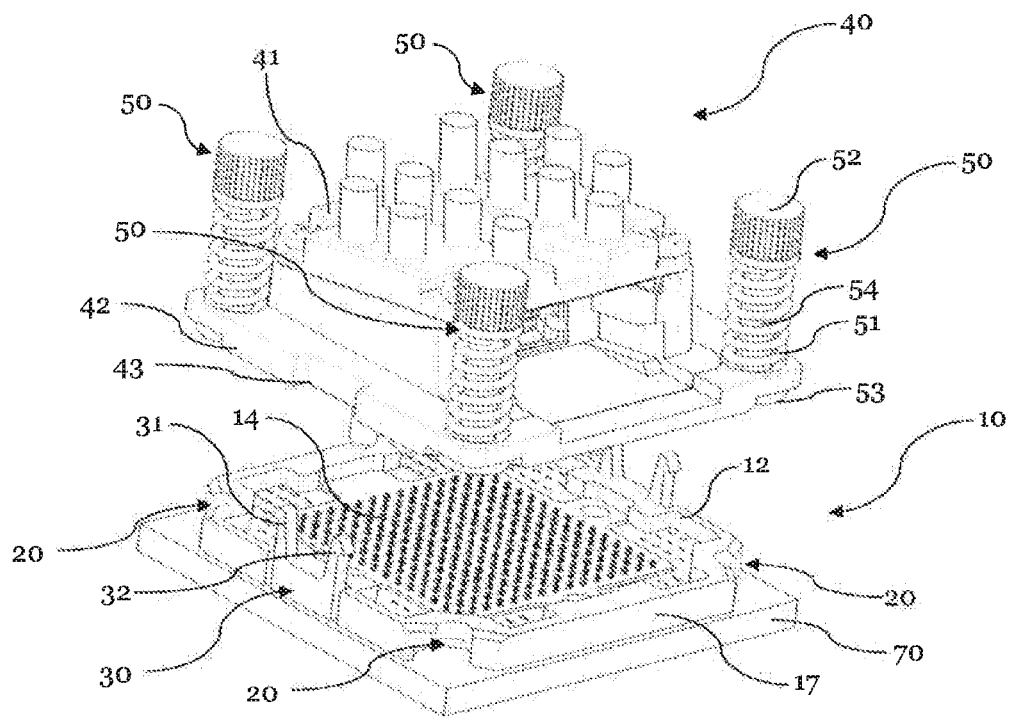
FIG. 1 shows a schematic three dimensional view of a mounting frame and an optical connector module.

FIG. 1 shows a mounting frame 10 attached to a printed circuit board (PCB) 70. Further, an optical connector module 40 is shown, which is not yet assembled to the mounting frame 10. The PCB 70 is for example a mother board and the mounting frame 10 comprises an interposer 14 as well as contact terminals to establish a signal connection between the mounting frame and for example the conductive traces (not shown) of the PCB 70. The mounting frame 10 comprises an essentially rectangular base frame 12 having four walls protruding perpendicular from the surface of the PCB in the attached condition as shown. In the outside walls 17 of the base frame—in the shown embodiment at the corners of the rectangular base frame 12—four locking undercuts 20 are provided, which are accessible from a peripheral side of the wall 17, i.e. from a direction parallel to the plane defined by the PCB 70 or the rectangular base frame 12. As will be described in more detail in the following, the undercuts 20 are formed to provide the female counterpart of a twistlock, which is in the shown embodiment of the bayonet type.

Further, the base frame 12 comprises two mate assist members 30, which are adapted to hold the connector module 40 in a preassembled position, to facilitate the mating or mounting process. In the shown embodiment, the mount or mate assist members 30 each comprise a pair of latching arms 31, 32, which interact together and are adapted to latch onto a corresponding latching portion 43 of the connector module 40.

The connector module 40 comprises a housing 41 having an essentially rectangular housing frame 42. At the four corners of the housing frame 42 male twistlock members 50 are arranged. Each male twistlock member 50 has a bolt 54 having a locking projection 53 on one end and a handle 52 on the opposite end. The bolt 54 is arranged coaxially in a compression spring 51. As the skilled person will recognize from considering the figures, the compression spring 51 will bias the bolt against a movement in axial direction of the bolt from the top face of the module towards the bottom face of the module, i.e. in the orientation shown in FIG. 1 in a downward movement towards the mounting frame 10 (it is clear to the skilled person that the shown elements can in practice be arranged in any spatial orientation and that expressions such as "downwards" are merely used in connection with the figures to facilitate the description). Thereby, the module is spring loaded onto the mounting frame in mounted condition. This spring loaded connection provides particularly advantageous contact normal forces between the socket or frame contacts and the module contacts and provides a facilitated installation and removal of the module from the frame. The male twistlock members 50 extend through the housing frame 42 of the connector module 40, such that each bolt 54 is moveable in longitudinal direction of the bolt and at the same time rotatable around the longitudinal axis of the bolt.

The housing frame 42 further comprises latching portions 43, which are adapted to be engaged by the latching arms 31, 32. Thereby, the mating process of connector module to mounting frame 10 is significantly facilitated: In order to achieve a first attachment or connection of connector module to mounting frame, it is simply sufficient to press the connector module 40 downward towards the mounting frame 10, until the latching arms 31 and 32 latch onto the latching portion 43. This arrangement is shown in FIG. 2, which shows the connector module 40 mated or mounted to the mounting frame 10.

Figure 3:
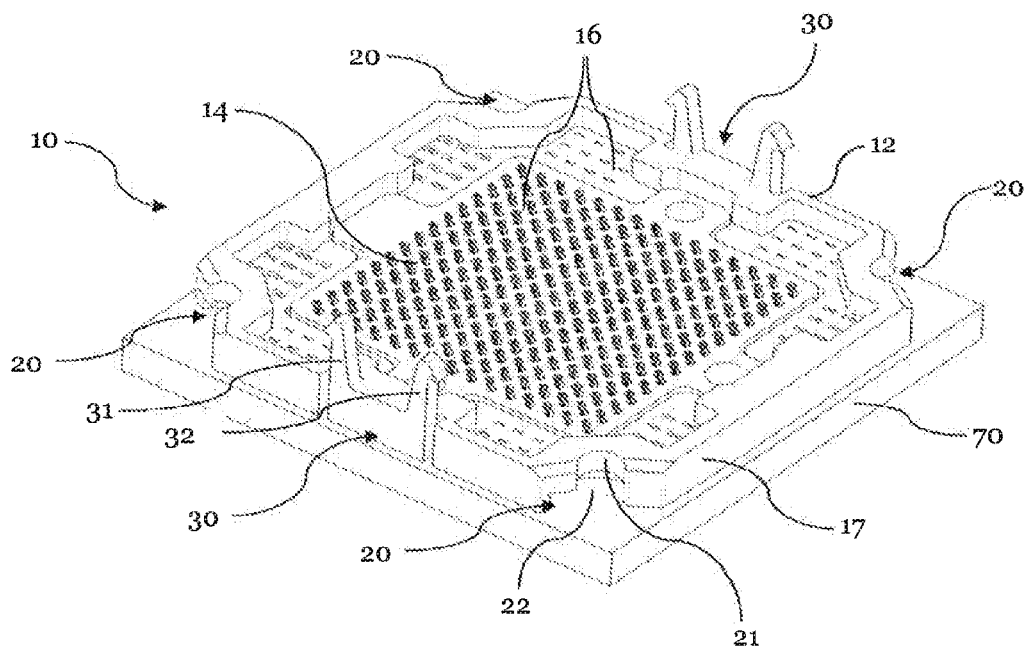
FIG. 3 shows a three dimensional detailed view of the mounting frame of FIG. 1.

Now turning to FIG. 3, the mounting frame 10 is shown in more detail. Also in FIG. 3, the mounting frame 10 is attached to the surface of a PCB 70. One can clearly see from FIG. 3, that the mounting frame 10 has a symmetrical design comprising mate assist members 30 on two opposite sides thereof. In the shown embodiment, the mate assist members 30 are integrally formed and monolithic with the base frame 12. Likewise integrally formed and monolithic with the base frame 12, namely in the outside walls of the frame, four locking undercuts 20 are provided. As one can take from the figure, the undercuts 20 are accessible from the peripheral side of the wall, due to an opening denoted in the following as access 22. In addition, in the top side of the mounting frame, i.e. the side visible in FIG. 3, semi-circular cut-outs 21 are provided, which additionally allow access to the undercut portion 20 from the top side of the frame.

Figure 2:
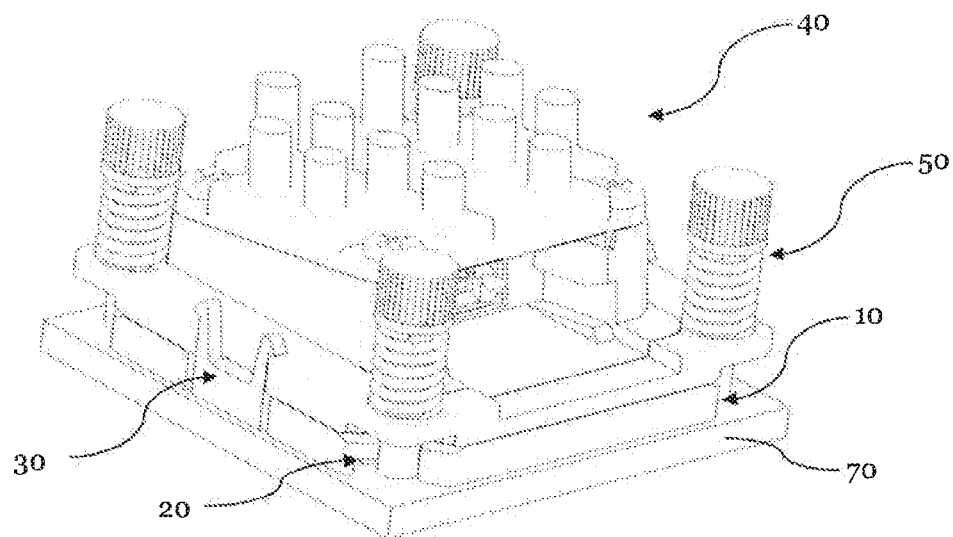
FIG. 2 shows the same part as FIG. 1 in assembled condition.
Figure 4:
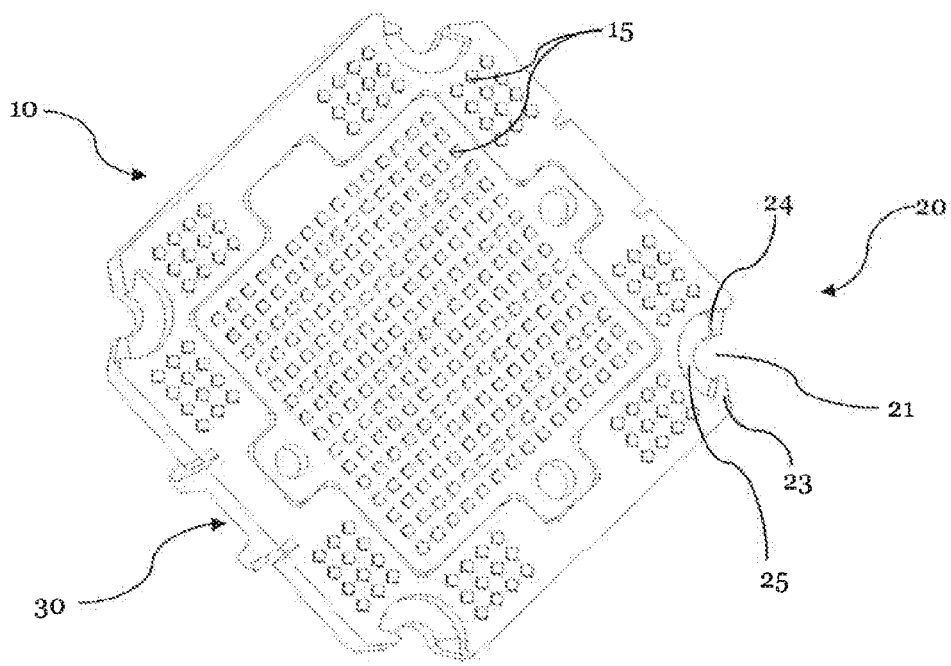
FIG. 4 shows the same mounting frame seen from the bottom side.

FIG. 4 shows the same mounting frame 10 as seen from the bottom side, i.e. from the side which faces the surface of the PCB in the attached condition shown in FIG. 2. Thus, the bottom side faces opposite the top side. At the bottom side of the mounting frame a large number of solder balls 15 are provided, which together with the terminals 16 provided on the top face of the mounting frame enable a signal or electrical connection to for example the traces and electronic components of the PCB.

In FIG. 4, one can further see details of the particular shape of the undercuts 20. Each undercut 20 comprises an arc-shaped, for instance a semi-circular, cavity 25, which is adapted to receive the locking projections 53 of the male twistlock members 50. By rotating the male twistlock members around the longitudinal axis of bolt 54, the locking projections 53 thereof are moved into the semi-circular cavity 25. To facilitate the locking process, a stop wall 23 is provided and on the opposite end an inclined ramp 24, which facilitates the movement of the locking projections into the cavity 25. The embodiment shown in the figures is a most preferred embodiment and represents the to-date best known arrangement.

Figure 5:
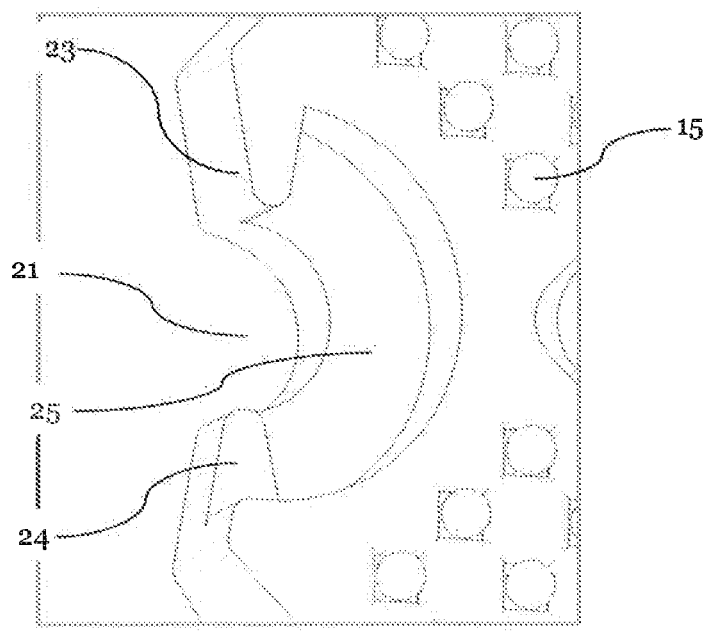
FIG. 5 shows a detail of a locking undercut provided on the mounting frame.
Figure 6:
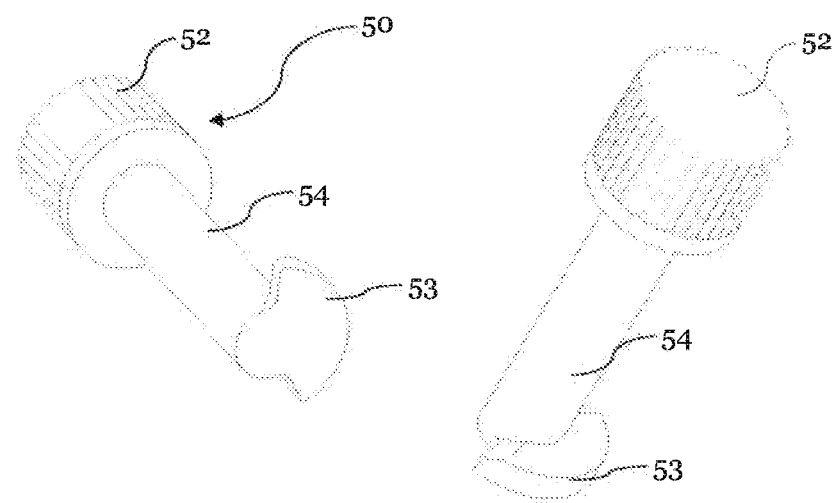
FIG. 6 shows a male twistlock member from different perspectives.

FIG. 5 shows another detailed view of undercut 20. One can see in connection with FIG. 6, which shows a detailed view of a male twistlock member 50 (with the compression spring removed for the sake of clarity), how the member 50 is particularly adapted to interact with undercut 20. To this end, the male twistlock member 50 comprises a locking projection 53, which has a semi-circular cross-section in a plane perpendicular to the longitudinal axis of bolt 54. The handle 52 facilitates the manual rotation and thus locking of the male twistlock members 50 and serves at the same time as fixation for the compression spring. The handle can e.g. be screwed onto the bolt 54, thereby enabling a simple mounting of the members 50 onto the connector module 40. Locking projection 53 and semi-circular cavity 25 are correspondingly shaped, such that the locking projection 53 can easily be rotated into the cavity 25 by rotating bolt 54. However, due to ramp 24 the locking projection 53 remains in the locked position if no external force is applied.

Figure 7:
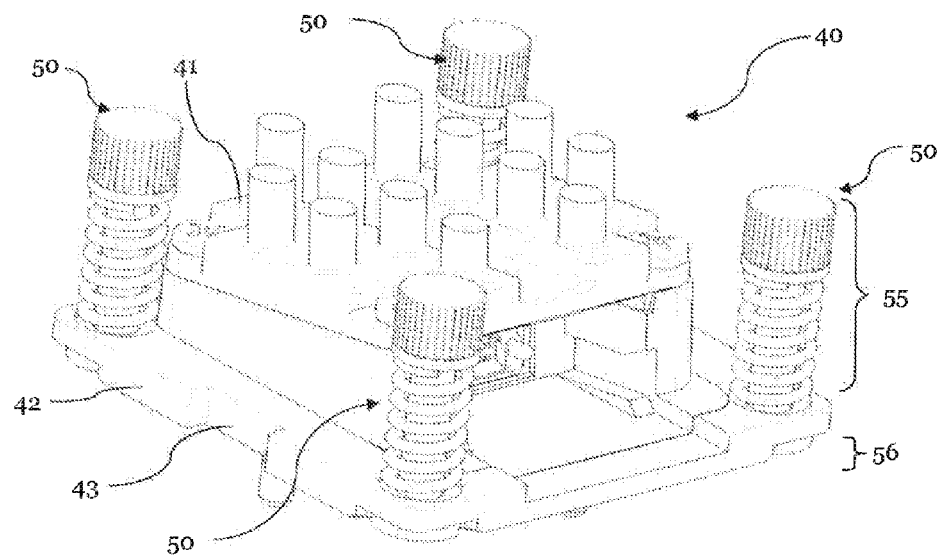
FIG. 7 shows the optical connector module of FIG. 1 in a schematic three dimensional view.

In FIG. 7, the connector module 40 is again shown in a slightly enlarged view without the mounting frame. From this view, it can be seen how the male twistlock members 50 have an upper part 55 projecting from the top face of the connector module and lower part 56 projecting from the bottom face of the connector module. The compression spring 51 is arranged on the upper part 55 and the locking projection is arranged on the lower part 56.

Figure 8:
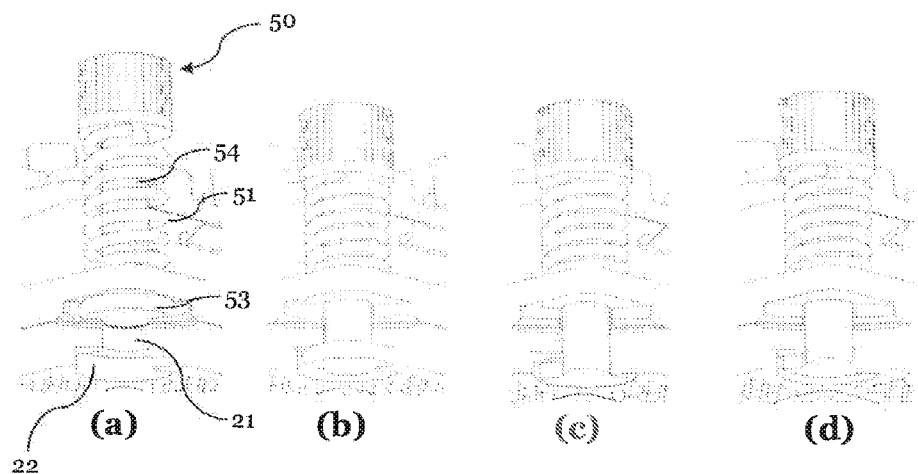
FIG. 8a-d shows in a detailed three dimensional view the ocking process of connector module to mounting frame.

The locking process is in the following explained in more detail under reference to FIGS. 8(*a*) to (*d*). In FIG. 8*a* the situation is shown, when the connector module 40 is in a pre-mated position, where the mate assist member 30 of the mounting frame 10 is latched onto latching portion 43, thereby retaining the connector module 40 in the position shown in FIG. 8*a*. However, the mate assist member 30 only serves to facilitate the actual locking or mating process, which is achieved by means of the male twistlock members 50 and the corresponding undercuts 20. In FIG. 8*a*, the male twistlock member 50 is not yet locked, and the locking projection 53 thereof is arranged above the semi-circular cut-out 21 and extends in a direction away from the corners of the frame. Bolt 54 is however in alignment with the semi-circular cut-out 21, so that it is possible to manually push the member 50 downwards in the figures, until the locking projection 53 is in alignment with the undercut 20 and adjacent the peripheral access 22 to the undercut. This situation is shown in FIG. 8*b*. One can see how compression spring 51 is now compressed. In FIG. 8*c*, the member 50 is rotated around the longitudinal axis of the bolt by approximately 180 degrees. Thereby, the locking projection 53 enters the undercut 20, respectively the semi-circular cavity 25 formed by the undercut. In the situation of FIG. 8*c*, male member 50 is still manually compressed downwardly. FIG. 8*d* shows the completely locked position, when no further pressure is applied on the top of member 50. One can see from a comparison of FIGS. 8*c* and *d*, that at 8*d* the compression spring moved the male member 50 slightly upwards in the figure, so that the locking projection 53 now securely rests inside of undercut 20. The skilled person will recognize that thereby the module is spring loaded onto the mounting frame in this mounted condition.

Figure 9:
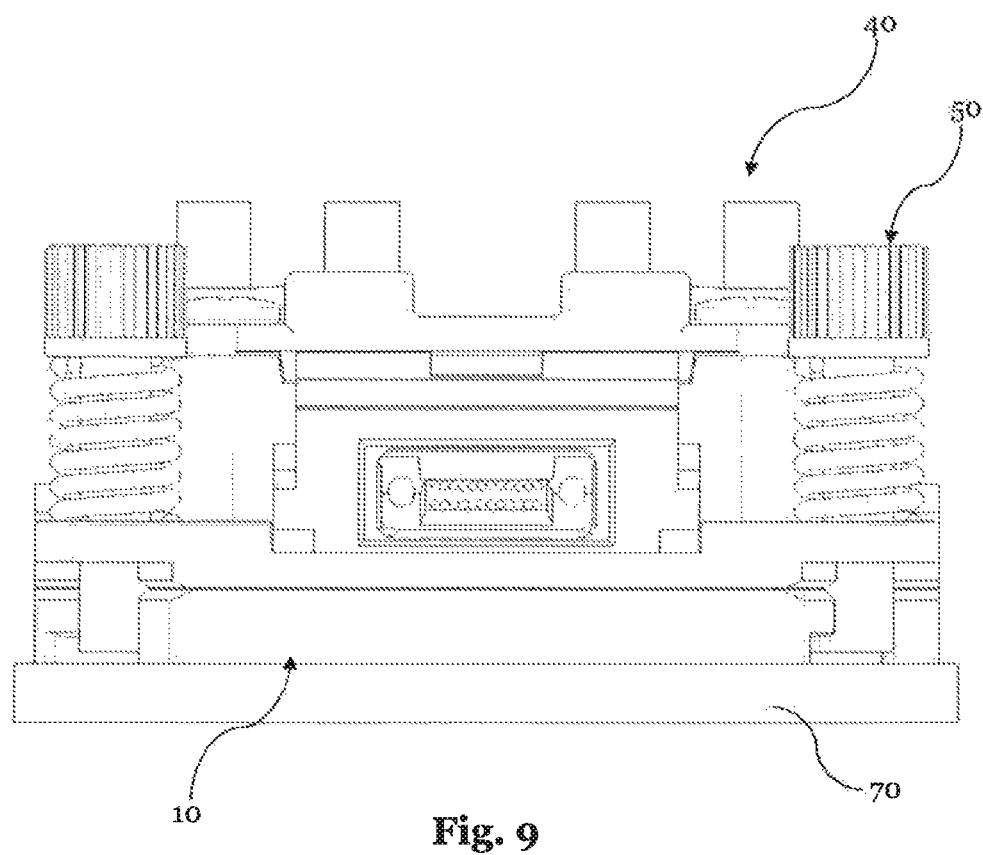
FIG. 9 shows a side view of the connector module assembled to the mounting frame.

FIG. 9 shows the same situation as FIG. 2, however seen from a lateral side of connector module 40 and mounting frame 10.

The invention claimed is:

1. A mounting frame system configured to mount a connector module to a printed circuit board, the mounting frame system comprising:
   a mounting frame configured to attach to a printed circuit board, and adapted to attach to the connector module, wherein the mounting frame include a base frame that defines an outside wall and at least one locking undercut open to a peripheral side of the outside wall, wherein the locking undercut defines a female counterpart of a twistlock of the connector module.

2. The mounting frame system of claim 1, wherein the base frame comprises a mate assist member adapted to hold the connector module in a pre-assembled position.

3. The mounting frame system of claim 2, wherein the mate assist member comprises at least one pair of latching arms adapted to latch onto a corresponding latching portion of the connector module to facilitate the mounting of the connector module with the mounting frame.

4. The mounting frame system of claim 1, wherein the mounting frame defines an interposer.

5. The mounting frame system of claim 1, wherein the outside wall of the base frame protrudes in a direction perpendicular from a surface of the printed circuit board when attached thereto, and the at least one locking undercut is arranged on the outer peripheral wall of the base frame.

6. The mounting frame system of claim 5, wherein the locking undercut is arranged on the outer peripheral wall of the base frame at a corner of the base frame.

7. The mounting frame system of claim 5, wherein the mounting frame has a top side and a bottom side opposite the top side, the bottom side faces the surface of the printed circuit board in attached condition, and the top side has at least one semi-circular cut-out that allows access to the undercut from the top side of the frame.

8. The mounting frame system of claim 1, further comprising the connector module, wherein the connector module is releasable mountable to the mounting frame.

9. The mounting frame system as recited in claim 1, wherein the connector module is an optical connector module.

10. The mounting frame system of claim 9, wherein the connector module comprises at least one male twistlock member adapted to engage the locking undercut to releasable mount the connector module onto the mounting frame.

11. The mounting frame system of claim 10, wherein the male twistlock member comprises a bolt extending through the connector module, and the bolt is arranged on the module such that it is movable in longitudinal direction of the bolt and rotatable around a longitudinal axis of the bolt.

12. The mounting frame system of claim 11, wherein the male twistlock member has an upper part projecting from the top face of the connector module and a lower part projecting from the bottom face of the connector module, whereby the upper part comprises a compression spring and the lower part comprises a locking projection extending perpendicular to the longitudinal axis of the bolt.

13. The mounting frame system of claim 12, wherein the locking projection has a semi-circular cross section in a plane perpendicular to the longitudinal axis of the bolt.

14. The mounting frame system of claim 13, wherein the upper part is arranged coaxially in the compression spring and the spring biases the bolt against a movement in axial direction of the bolt from the top face of the module towards the bottom face of the module.

15. The mounting frame system of claim 9, wherein the module comprises an essentially rectangular base and has four male twistlock members arranged on respective four opposite sides of the base.

16. The mounting frame system of claim 15, wherein the module is spring loaded onto the mounting frame when mounted thereon.

17. The mounting frame system of claim 1, wherein the connector module is an optical connector module and comprises a transducer to convert electromagnetic signals to electrical signals.

18. The mounting frame system of claim 16, wherein each of the male twistlock members comprises a bolt extending through the connector module, and the bolt is arranged on the module such that it is movable in longitudinal direction of the bolt and rotatable around a longitudinal axis of the bolt.

19. The mounting frame system of claim 18, wherein each of the male twistlock members has an upper part projecting from the top face of the connector module and a lower part projecting from the bottom face of the connector module, whereby the upper part comprises a compression spring and the lower part comprises a locking projection extending perpendicular to the longitudinal axis of the bolt.

20. The mounting frame system of claim 19, wherein the locking projection has a semi-circular cross section in a plane perpendicular to the longitudinal axis of the bolt, the upper part is arranged coaxially in the compression spring, and the spring biases the bolt against a movement in axial direction of the bolt from the top face of the module towards the bottom face of the module.

* * * * *